May 28, 1968  E. S. PIERCE  3,385,028
PACKAGING MACHINE
Filed Feb. 2, 1965
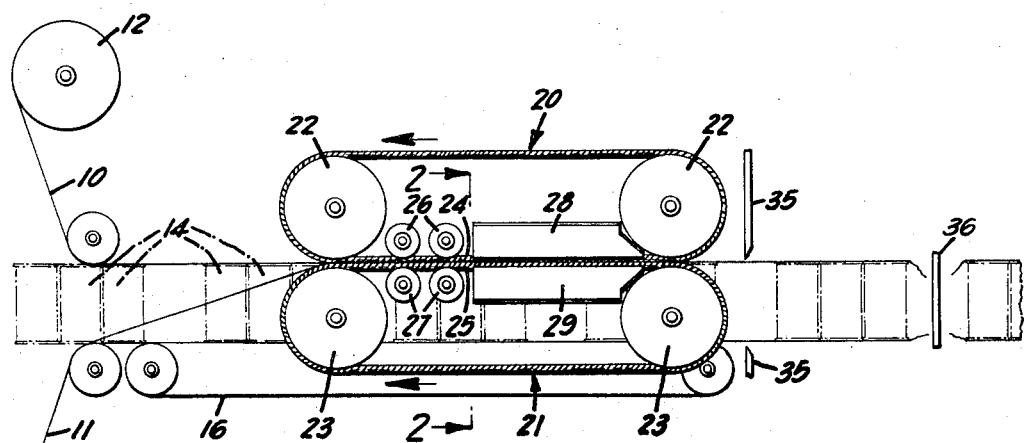
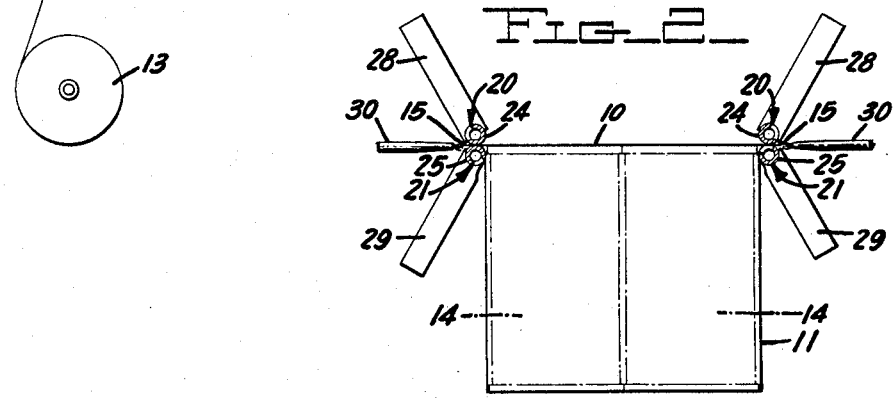
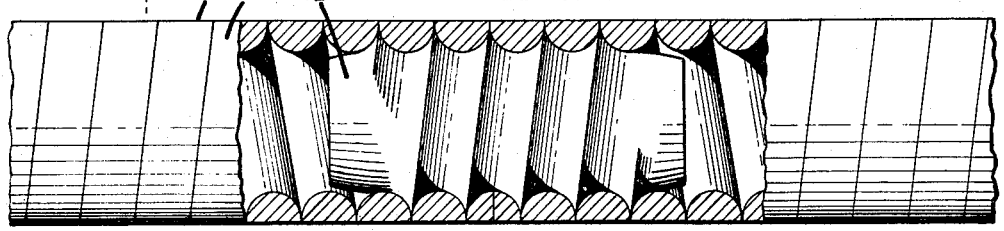
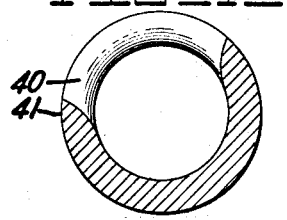
INVENTOR.
Edward S. Pierce
BY
ATTORNEY.

United States Patent Office 3,385,028
Patented May 28, 1968

3,385,028
PACKAGING MACHINE
Edward S. Pierce, Sinking Spring, Pa., assignor, by mesne assignments, to E. I. du Pont de Nemours and Company, a corporation of Delaware
Filed Feb. 2, 1965, Ser. No. 429,806
1 Claim. (Cl. 53—373)

ABSTRACT OF THE DISCLOSURE

A machine for packaging articles in heat-sealable packaging film comprising a pair of endless belts suitably guided into closely spaced parallel runs to confine therebetween overlapping edge portions of the packaging film, and means for heating the confined edge portions to sealing temperature, said endless belts being formed of tightly coiled steel wire springs the outer surfaces of which are removed by milling or grinding down until slightly more than half the diameter of the wire is left to provide the coil spring with a substantially continuous cylindrical outer surface which contacts the confined film on a substantially unbroken line along which the heat seal between the overlapping portions of film is formed.

---

The instant invention relates to machines or apparatus for enclosing articles or other items in heat sealable films. More particularly the invention concerns such apparatus in which upper and lower films, with the items to be enclosed positioned therebetween and with the longitudinal margins of the films in overlapping relationship, are conveyed forwardly and the overlapped margins sealed together suitably by fusion during conveyance.

Heretofore it has been proposed to employ upper and lower belts in apparatus of the type referred to the upper run of a lower belt and the lower run of an upper belt confining the overlapping film margins therebetween on each side of the machine. Sealing or fusing of the overlapped film margins has been performed by heated rollers contacting the marginal portions just prior to their confinement between the belts or by applying heat to the marginal portions as they are conveyed by the belts. In the latter case the belts themselves may be heated or edge portions of the films projecting beyond the belts may be subjected to radiant heat or the like to cause the fusion of such edge portions.

The roller system of heating has proved ineffective for high speed packaging operations due to the extremely limited time of contact of the rollers with the film. On the other hand where the fusing operation has been performed during the confinement of the overlapped marginal portions between the belts it has been necessary to employ metal belts which will withstand the heat applied thereto. Such belts heretofore employed have been formed of flat steel strips the ends of which are butt welded together to complete the belt, the strips, under the circumstances, necessarily being of substantial cross section. As a consequence the belts are relatively inflexible and must be mounted on pulleys of undesirably large diameter. Further the belts being necessarily of substantial width cause wastage of the film due to the amount confined therebetween and their use also results in a package having undesirable characteristics.

The principal object of the invention is the provision of an apparatus of the type described above and involving the use of endless belts engaging the margins of the superposed films, which belts are of a type to permit the fusing operation to be performed during their travel with the film, which overcomes the disadvantages of the prior devices. More particularly an object of the invention is the provision of a packaging machine employing endless metal belts for the purposes described above in which the belts have inherent flexibility and further provide substantially line contact with the film.

The foregoing objects are attained according to the invention by forming each belt of a coiled wire spring which has been externally ground or otherwise modified to provide it with a substantially continuous outer surface lying in a cylindrical plane and the ends of which has been suitably joined. Such belts have the inherent flexibility necessary to permit them to be used with rollers or pulleys of relatively small diameter and further insure substantially line contact with the film with the result that substantial saving of film is achieved and a superior package obtained.

The invention will be more fully understood and further objects and advantages thereof will become apparent when reference is made to the more detailed description to follow and to the accompanying drawings in which:

FIG. 1 is a diagrammatic elevational view of a packaging apparatus incorporating the instant invention therein;

FIG. 2 is a sectional view on an enlarged scale taken on the line 2—2 of FIG. 1;

FIG. 3 is a detail view of an enlarged scale of a portion of a belt of the type employed in the apparatus of FIGS. 1 and 2; and FIG. 4 is a sectional view taken on the line 4—4 of FIG. 3.

Referring now to the drawings and particularly to FIG. 1 an apparatus is diagrammatically disclosed for packaging articles such as cans, boxes or the the like, although it is immaterial what the packaged item may be, between upper and lower film strips 10 and 11 respectively. Film strips 10 and 11 may be of any suitable composition which permit them to be heat sealed, for example they may be polyethylene or polypropylene films or the like. Alternatively they may be other sheet or film material not heat sealable themselves but carrying a heat sealable coating or impregnant at their longitudinal margins. All such materials will hereinafter be referred to as "films."

The apparatus comprises supply rolls 12 and 13 for the upper and lower film strips 10 and 11 respectively and means (not shown) which may be of any suitable type for delivering the items 14, or groups of them to be packaged between the films with the items or groups in spaced relationship. In the particular arrangement shown the items are to be packaged in groups of six. Also as shown the strips of film are so dimensioned and handled that film strip 10 covers the tops of the groups while the film strip 11 covers the bottoms and both sides of the groups both strips being of widths sufficiently in excess of that required for the above purposes to provide overlapping marginal edges 15 (see FIG. 2). It is to be understood however that these particular item groups and the manner in which they are enclosed by the film strips are shown for the purposes of illustration only and that the invention is equally applicable to other arrangements so long as overlapped marginal edges are provided for sealing purposes.

The apparatus further comprises endless belts, the character of which is the essence of the invention and which will be hereafter described in detail. If the articles to be packaged are of sufficiently light weight the belts may serve to convey not only the films but also the enclosed items through the machine. On the other hand if the items are relatively heavy a conveyor 16 may be positioned to underlie the lower film strip and carry the load. In such case the conveyor is driven at the same linear speed as the belts. In any event the belts serve to confine the overlapped marginal portions of the films during their passage through the machine. The belts include an upper belt 20 and a lower suitably identical belt 21 mounted on pulleys 22 and 23 respectively on each side of the machine in position to confine the marginal edge portions of the film between their adjacent runs 24 and 25.

Other and conventional features of the apparatus include upper and lower rollers 26 and 27, respectively, positioned on both sides of the apparatus and adapted to press the adjacent runs of the belts and the superposed margins of the films confined between them into closely contained relationship. Alternatively pressure shoes may be employed for this purpose. The apparatus may also include upper and lower cooling units 28 and 29 respectively located at each side of the machine forwardly of the presser rolls 26 and 27. The cooling units are suitably adapted for the circulation of a cooling medium therethrough.

To seal or fuse the marginal portions of the film means 30 may be provided which preferably, as illustrated in FIG. 2, comprises a gas flame or an electrical heating unit or the like adapted to apply flame or radiant heat to the marginal portions 15 of the superposed films projecting beyond the belts to bring them to a fusing temperature. The heating means 30 is located at both sides of the device and preferably in the vicinity of pressure rolls 26 and 27. Alternatively to the above described heating or fusing operation the belts 20 and 21 may themselves be heated to a temperature that they will cause the sealing or fusing action to take place along the line of contact of the belts with the films. Thus heat may be applied to the belts by a gas flame or other suitable media at any suitable location prior to the confinement of the film margin therebetween, for example during the outer runs of the belts.

In accordance with the instant invention each of the belts 20 and 21 basically comprises tightly wound coiled steel wire in the form of an extension spring 40, such springs being commercial items. The outer surface 41 of the spring is ground down as by centerless grinding or other suitable operation until slightly more than one-half of the diameter of the wire of the spring is left to provide the coil with a substantially continuous cylindrical outer surface 41 (see FIG. 3). The ends of the coil are joined as illustrated in FIG. 3 to provide an endless belt suitably by threading a threaded plug 42 into the convolutions of the opposed ends of the coil to bring the ends into and hold them in contiguous relationship. Inasmuch as the belts are circular in cross section pulleys 22 and 23 are suitably grooved to receive them.

In the operation of the apparatus described above employing the coiled wire or spring belts (FIGS. 3 and 4) the belts are driven in any suitable manner and in the direction indicated by the arrows (FIG. 1). Suitably the drive is intermittent to provide pauses to permit the severance of the films into individual package units following their passage through the apparatus. The films 10 and 11 are fed from the supplies 12 and 13 with the marginal portions of the films confined between the adjacent runs 24 and 25 of the belts at both sides of the apparatus. The items 14 to be packaged are placed between the films in any desired manner, and suitably at spaced intervals as previously mentioned, prior to entry of the films between the belts. As the films are carried forwardly and their margins brought into overlapping contact such edges are fused together by the application of heat thereto and the fused edges then cooled as the belts pass between the cooling units 28 and 29. Thereafter the films, now forming a tube with the items enclosed therein, pass beyond the belts and thereafter, suitably during the pauses in the forward movements of the belts, are separated as by vertical knives 35 and horizontal knives 36 into individual units and the portions of the film at the ends of the units sealed in any suitable way to provide individual closed packages. It will be understood that the portions of the apparatus and their operation other than the belts 20 and 21 have been illustrated and described only diagrammatically and may take any suitable or conventional form.

The coiled wire belts of the instant invention overcome the disadvantages of the previous constructions. Due to the flexibility of the coil springs the pulleys 22 and 23 may be relatively small. Furthermore the circular cross-sectional shape of the belts, as opposed to the flat shape of the belts heretofore employed for similar purposes, and their substantially continuous outer plane surfaces resulting from the grinding operation insure substantially line contact with the superposed films with the result that wastage of film is avoided and a neat closely fitting enclosure for the packaged items is obtained. The belts themselves may be heated to a film fusing temperature or heat may be applied to the edges of the film where they project beyond the belts without causing damage to the the latter as previously pointed out. The nature of the coiled springs also enables their ends to be joined by a threaded plug thus eliminating welded joints.

Having thus described the invention in rather full detail it will be understood that these details need not be strictly adhered to and that various changes and modifications may be made all falling within the scope of the invention as defined by the subjoined claim.

What is claimed is:

1. In a machine for fusing overlapping portions of heat sealable films, means for conveying said overlapping portions comprising belts having adjacent runs confining said overlapping portions therebetween, said belts comprising coiled wire springs each of said belts having a substantially continuous outer plane surface whereby to provide substantially continuous line contact with the film, and means for heating said overlapping portions while confined between said runs to cause fusion thereof and sealing along the line of contact.

References Cited

UNITED STATES PATENTS

| | | | |
|---|---|---|---|
| 2,253,036 | 8/1941 | Kimple et al. | 53—373 |
| 2,691,474 | 10/1954 | Olson | 53—373 X |
| 2,857,042 | 10/1958 | Gaubert | 198—165 |
| 2,913,863 | 11/1959 | Sylvester et al. | |

TRAVIS S. McGEHEE, *Primary Examiner.*